United States Patent
Teng et al.

(10) Patent No.: US 9,225,186 B2
(45) Date of Patent: Dec. 29, 2015

(54) METHOD AND DEVICE FOR CONTROLLING CHARGE OF BATTERY

(75) Inventors: Lingqiao Teng, Shenzhen (CN); Mingming Liu, Shenzhen (CN); Yanni Meng, Shenzhen (CN); Baohang Zhou, Shenzhen (CN); Shuwang Wei, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 194 days.

(21) Appl. No.: 13/979,379

(22) PCT Filed: Aug. 30, 2011

(86) PCT No.: PCT/CN2011/079110
§ 371 (c)(1),
(2), (4) Date: Jul. 12, 2013

(87) PCT Pub. No.: WO2012/094899
PCT Pub. Date: Jul. 19, 2012

(65) Prior Publication Data
US 2013/0285619 A1    Oct. 31, 2013

(30) Foreign Application Priority Data
Jan. 14, 2011 (CN) .......................... 2011 1 0008516

(51) Int. Cl.
G06F 17/50    (2006.01)
H02J 7/00    (2006.01)

(52) U.S. Cl.
CPC .................................. H02J 7/0052 (2013.01)

(58) Field of Classification Search
CPC . H01M 2010/4271; H02J 7/007; H02J 5/005; A61N 1/3787
USPC ................................................. 320/136, 150
See application file for complete search history.

(56) References Cited

U.S. PATENT DOCUMENTS

| 6,799,650 B2 | 10/2004 | Komiyama et al. |
| 7,576,525 B2 | 8/2009 | So et al. |

(Continued)

FOREIGN PATENT DOCUMENTS

| CN | 101394103 A | 3/2009 |
| CN | 101611361 A | 12/2009 |

(Continued)

OTHER PUBLICATIONS

International Search Report in international application No. PCT/CN2011/079110, mailed on Nov. 10, 2011.
English Translation of the Written Opinion of the International Search Authority in international application No. PCT/CN2011/079110, mailed on Nov. 10, 2011.

*Primary Examiner* — Nghia Doan
(74) *Attorney, Agent, or Firm* — Oppedahl Patent Law Firm

(57) ABSTRACT

A method for controlling charge of a battery includes: when charging a battery, monitoring a temperature of the battery in real time, and acquiring a corresponding dynamic factor according to the temperature of the battery, wherein the dynamic factor is used for characterizing a dynamically regulating component of a charge current coefficient during the charge process; calculating a maximum allowed charge current according to the dynamic factor and preset static factors; and controlling the charge of the battery according to the maximum allowed charge current. This enables adaptive charge management according to application scenarios, which effectively avoids the situation where the charge current of the battery is too high or too low, improves the environmental adaptability of battery charging, and further extends the service life of the battery and saves costs. Also provided is a method for controlling charge of a battery.

12 Claims, 4 Drawing Sheets

(56) References Cited

U.S. PATENT DOCUMENTS

| | | |
|---|---|---|
| 2002/0195288 A1 | 12/2002 | Komiyama et al. |
| 2005/0017270 A1* | 1/2005 | King .......................... 257/202 |
| 2008/0094865 A1 | 4/2008 | So et al. |
| 2009/0085527 A1 | 4/2009 | Odaohhara |
| 2009/0271132 A1* | 10/2009 | Furukawa et al. ............. 702/63 |
| 2010/0270979 A1 | 10/2010 | Bonkhoff et al. |
| 2012/0112706 A1* | 5/2012 | Henkel ................. H02J 7/0091 320/157 |

FOREIGN PATENT DOCUMENTS

| | | |
|---|---|---|
| CN | 101702453 A | 5/2010 |
| CN | 101872994 A | 10/2010 |
| JP | 2003009305 A | 1/2003 |

* cited by examiner

METHOD AND DEVICE FOR CONTROLLING CHARGE OF BATTERY

TECHNICAL FIELD

The disclosure relates to the field of electrics, and in particular to a method and device for controlling charge of a battery.

BACKGROUND

In recent years, the proportion of battery investment in the total equipment investment increases continuously with the rising cost of raw materials, and people have paid more and more attentions to managing battery charge and discharge scientifically and prolonging the service lives of batteries effectively. The advantages and disadvantages of a battery charge management method are of great importance for maintaining the capacity of a battery effectively and prolonging the service life of the battery. In an existing charge management method, battery current and voltage change curves in a battery charge process are as shown in FIG. 1, mainly including the following phases:

time slot t0-t1: a main power supply system supplies power normally, and the battery is in a floating charge state with a very small charge current for maintaining a constant power source only;

time slot t1-t2: the main power supply system stops supplying power, and the battery discharges to supply electric energy required by a load;

time slot t2-t3: the main power supply system restores power supply, supplies electric energy required by the load, and charges the battery at the same time; and the battery is in a constant current charge phase which is a key phase in the battery charge management;

time slot t3-t4: with gradual restoration of the battery capacity, the charge current of the battery decreases gradually while the battery voltage increases continuously; and the battery enters a constant voltage charge phase when the battery voltage reaches a preset target voltage value;

time slot t4-t5: the battery is close to the full capacity, the charge current decreases to zero gradually, and the battery enters a maintenance charge phase which is also known as an absorption phase;

after moment t5, the battery charge ends, the charge current is close to zero, the battery restores the floating charge voltage and is in the floating charge state.

Device usage scenarios are different in practical application. For example, a small capability generator is generally used for power generation in an emergency power supply solution applied by a communication base station in a remote area. If a battery is charged and a load is powered still according to a power supply current of an alternating current grid when the generator is started, the generator may be started frequently due to insufficient load capacity, thereby influencing the service life of the battery. For another example, a battery may discharge deeply when an alternating current commercial power fails frequently. The battery may be never fully charged if not charged by a large current rapidly, and the service life of the battery will be seriously influenced as time passes. At the same time, the battery capacity of a battery which has been used for a long period of time will decrease gradually, and the battery may be overcharged if the charging current of the battery is not reduced properly.

Therefore, existing battery charge management methods, which apply a constant is current first and a constant voltage subsequently to compensate the capacity loss of a battery, fail to perform dynamic regulation according to device application scenarios, thus the charge current of the battery may be inevitably too high or too low to further influence the service life of the battery.

SUMMARY

The disclosure provides a method and device for charging a battery, to enable adaptive charge management according to application scenarios and improve the environmental adaptability of battery charging to further extend the service life of the battery and save costs.

A specific technical solution provided by an embodiment of the disclosure is as follows:

a method for controlling charge of a battery includes:

when charging a battery, monitoring a temperature of the battery in real time, and acquiring a corresponding dynamic factor according to the temperature of the battery, wherein the dynamic factor is used for characterizing a dynamically regulating component of a charge current coefficient during the charge process;

calculating a maximum allowed charge current according to the dynamic factor and preset static factors, wherein the static factors are used for characterizing fixed components of the charge current coefficient during the charge process;

controlling the charge of the battery according to the maximum allowed charge current.

In the solution above, the method may further include: before charging the battery, presetting the static factors based on the battery and a power supply system for the battery.

In the solution above, the presetting the static factors based on the battery and a power supply system for the battery may include:

setting a static factor $Cr$ according to a charge coefficient marked on the battery;

setting a static factor $Cg$ according to power of a power supply system backup power source;

counting power supply stability data of a main power supply system, and setting a static factor $Ck$ according to the power supply stability data;

counting and acquiring a static capacity of the battery, and setting a static factor $Cm$ according to the static capacity.

In the solution above, the monitoring a temperature of the battery in real time and acquiring a corresponding dynamic factor according to the temperature of the battery may include:

monitoring the temperature of the battery in real time, and acquiring a current battery temperature;

calculating a difference between a preset battery reference temperature and the current battery temperature, and multiplying the difference by a preset coefficient to obtain the dynamic factor.

In the solution above, the calculating a maximum allowed charge current according to the dynamic factor and preset static factors may include:

calculating a sum of the dynamic factor and the preset static factors, and acquiring the charge current coefficient according to the calculated result;

calculating a product of the charge current coefficient and a battery nominal capacity, and using the calculated result as the maximum allowed charge current.

In the solution above, the calculating a sum of the dynamic factor and the preset static factors and acquiring the charge current coefficient according to the calculated result may include:

determining whether the calculated result is greater than or equal to a preset charge current coefficient minimum value, and smaller than or equal to a preset charge current coefficient maximum value;

if yes, using the calculated result as the charge current coefficient;

otherwise, when determining that the calculated result is smaller than the preset charge current coefficient minimum value, using the preset charge current coefficient minimum value as the charge current coefficient; and when determining that the calculated result is greater than the preset charge current coefficient maximum value, using the preset charge current coefficient maximum value as the charge current coefficient.

The disclosure provides a device for controlling charge of a battery, which includes: a first processing unit, a second processing unit and a third processing unit, wherein the first processing unit is configured to, when charging a battery, monitor a temperature of the battery in real time, and to acquire a corresponding dynamic factor according to the temperature of the battery, wherein the dynamic factor is used for characterizing a dynamically regulating component of a charge current coefficient during the charge process;

the second processing unit is configured to calculate a maximum allowed charge current according to the dynamic factor and preset static factors, wherein the static factors are used for characterizing fixed components of the charge current coefficient during the charge process;

the third processing unit is configured to control the charge of the battery according to the maximum allowed charge current.

In the solution above, the first processing unit may be configured to, before charging the battery, preset the static factors based on the battery and a power supply system for the battery.

In the solution above, the first processing unit may be specifically configured to monitor the temperature of the battery in real time, and acquire a current battery temperature; to calculate a difference between a preset battery reference temperature and the current battery temperature, and multiply the difference by a preset coefficient to obtain the dynamic factor.

In the solution above, the second processing unit may be specifically configured to calculate a sum of the dynamic factor and the preset static factors, and acquire the charge current coefficient according to the calculated result; to calculate a product of the charge current coefficient and a battery nominal capacity, and use the calculated result as the maximum allowed charge current.

In the solution above, the second processing unit may be specifically configured to determine whether the calculated result is greater than or equal to a preset charge current coefficient minimum value, and smaller than or equal to a preset charge current coefficient maximum value; if yes, to use the calculated result as the charge current coefficient; otherwise, when determining that the calculated result is smaller than the preset charge current coefficient minimum value, to use the preset charge current coefficient minimum value as the charge current coefficient; and when determining is that the calculated result is greater than the preset charge current coefficient maximum value, to use the preset charge current coefficient maximum value as the charge current coefficient.

Based on the technical solution above, in an embodiment of the disclosure, when charging a battery, the temperature of the battery is monitored in real time, and a corresponding dynamic factor is acquired according to the temperature of the battery. A maximum allowed charge current is calculated by combining the dynamic factor and each preset static factor so as to regulate the maximum allowed charge current dynamically according to environmental changes, and control the charge of the battery according to the maximum allowed charge current. Therefore, this enables adaptive charge management according to application scenarios, which effectively avoids the situation where the charge current of the battery is too high or too low, improves the environmental adaptability of battery charging, and further extends the service life of the battery and saves costs.

DETAILED DESCRIPTION

In order to improve the environmental adaptability of battery charging to further extend the service life of a battery and save costs, embodiments of the disclosure provide a battery charge management method and device capable of performing adaptive charge management according to application scenarios, and improving the environmental adaptability of battery charging to further extend the service life of a battery and save costs. The method includes: when charging a battery, monitoring a temperature of the battery in real time, and acquiring a corresponding dynamic factor according to the temperature of the battery, wherein the dynamic factor is used for is characterizing a dynamically regulating component of a charge current coefficient during the charge process; calculating a maximum allowed charge current according to the dynamic factor and preset static factors, wherein the static factors are used for characterizing fixed components of the charge current coefficient during the charge process; and controlling the charge of the battery according to the maximum allowed charge current.

A preferred embodiment of the disclosure will be described in details below in combination with the drawings.

Figure 1:
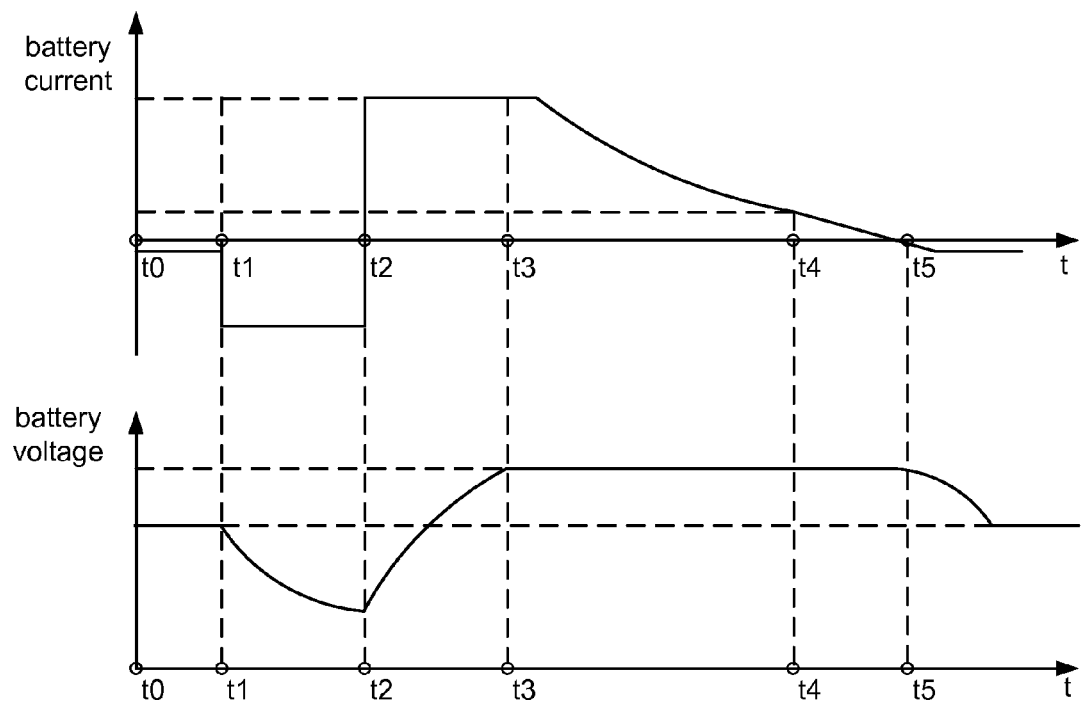
FIG. 1 is a schematic diagram illustrating existing current and voltage changes during charging a battery.
Figure 2:
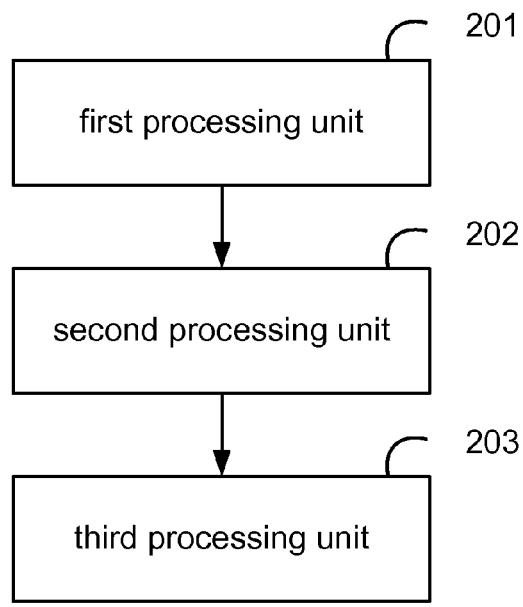
FIG. 2 is a structural diagram of a device for controlling charge of a battery in an embodiment of the disclosure.

Referring to FIG. 2, in an embodiment of the disclosure, a device for controlling charge of a battery mainly includes the following processing units: a first processing unit 201, a second processing unit 202 and a third processing unit 203, wherein the first processing unit 201 is configured to, when charging a battery, monitor a temperature of the battery in real time, and to acquire a corresponding dynamic factor according to the temperature of the battery, wherein the dynamic factor is used for characterizing a dynamically regulating component of a charge current coefficient during the charge process;

the second processing unit 202 is configured to calculate a maximum allowed charge current according to the dynamic factor and preset static factors, wherein the static factors are used for characterizing fixed components of the charge current coefficient during the charge process;

the third processing unit 203 is configured to control the charge of the battery according to the maximum allowed charge current.

Figure 3:
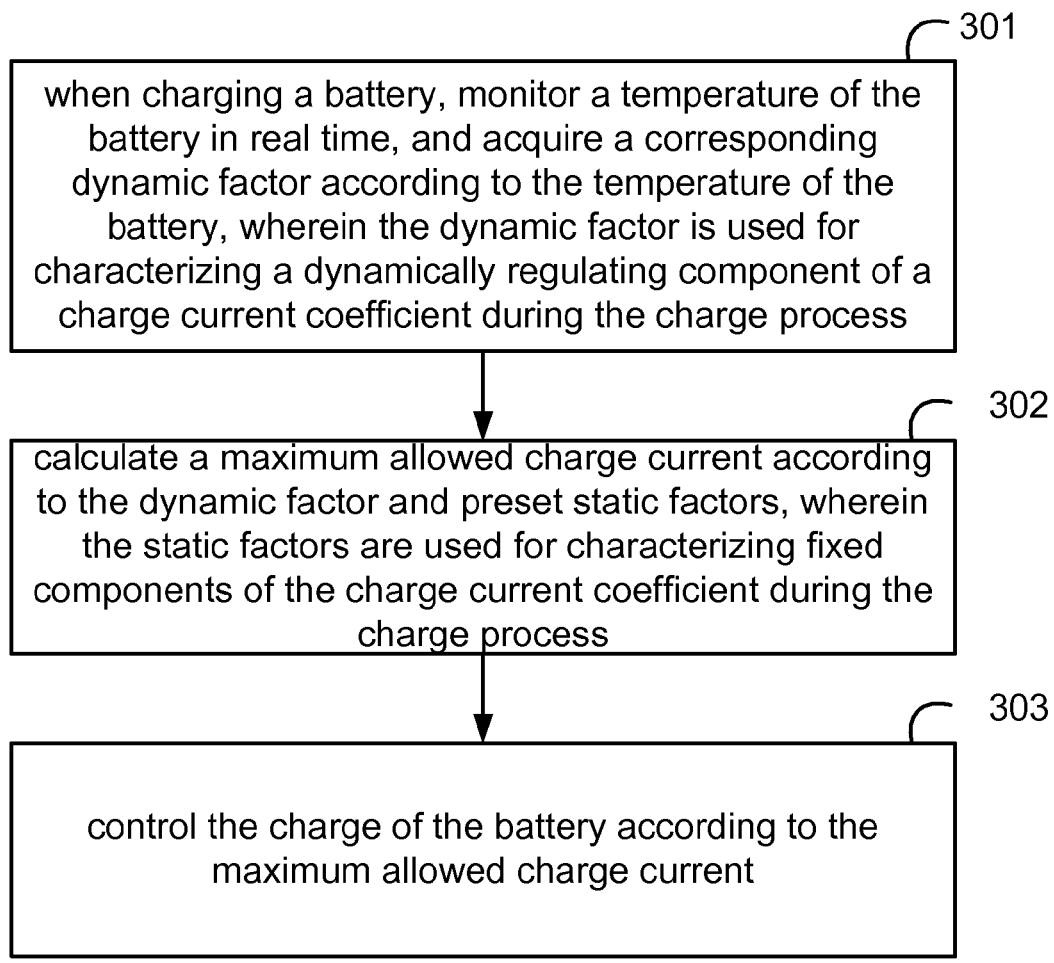
FIG. 3 is a flowchart of a method for controlling charge of a battery in an embodiment of the disclosure.

Based on the above system structure architecture, referring to FIG. 3, a method for controlling charge of a battery in an embodiment of the disclosure includes the following detailed process:

Step 301: when charging a battery, monitor a temperature of the battery in real time, and acquire a corresponding dynamic factor according to the temperature of the battery, wherein the dynamic factor is used for characterizing a dynamically regulating component of a charge current coefficient during the charge process;

before charging the battery, each static factor is preset based on the battery and a power supply system for the battery, and each static factor does not change during the charge process, specifically including: set a static factor Cr according to a charge coefficient marked on the battery; set a static factor Cg according to power of a power supply system backup power source; count power supply stability data of a main power supply system, and set a static factor Ck according to the power supply stability data; count and acquire a static capacity of the battery, and set a static factor Cm according to the static capacity; wherein the static factor Cr is generally the charge coefficient marked by a battery manufacturer; the static factor Cg is determined by the power of the backup power source, and may be increased within a set range when the power of the backup power source is relatively high; the static factor Ck is set according to the stability of the main power supply system, i.e., the static factor Ck is set according to the power supply stability data counted and acquired. For example, the static factor Ck is set according to a power failure frequency of the main power supply system and the duration of each power failure, i.e., the power supply stability data is acquired through counting the power failure frequency or the duration of each power failure. If the power failure frequency is high or the duration of each power failure is relatively long, the acquired power supply stability data is relatively large, which also indicates that the power supply stability of the main power supply system is poor, then Ck may be increased in the set range to accelerate the charge process; the static factor Cm reflects the battery capacity, and may be reduced within a set range when the battery capacity is relatively low in order to prevent overcharging;

preferably, when the static factor Cg is set according to the power supply system backup power source, the static factor Cg may be set according to the power of the backup power source, e.g. when the backup power source is a generator, the static factor Cg is set according to the power of the generator; when counting the power supply stability data of the main power supply system and setting the static factor Ck according to the power supply stability data, the static factor Ck is increased automatically if it is learned through the power supply stability data counted and acquired that the power supply stability of the main power supply system is poor within a preset period of time, and the static factor Ck is reduced automatically if it is learned through the power supply stability data counted and acquired that the power supply stability of the main power supply system becomes better. For example, the static factor Ck may be increased automatically if a main power supply system alternating current grid fails frequently in a preset period of time; when counting and acquiring the static capacity of the battery and setting the static factor Cm according to the static is capacity, the number of charging and discharging times or the service time of the battery may be counted. The static factor Cm is reduced by a set value when a set threshold is reached, e.g. when it is counted that the number of charging and discharging times of the battery is increased by 500 times, the static factor Cm is reduced by a set value, wherein the monitoring a temperature of the battery in real time and acquiring a corresponding dynamic factor according to the temperature of the battery specifically includes: monitoring the temperature of the battery in real time, and acquiring a current battery temperature; calculating a difference between a preset battery reference temperature and the current battery temperature, and multiplying the difference by a preset coefficient to obtain the dynamic factor.

Figure 5:
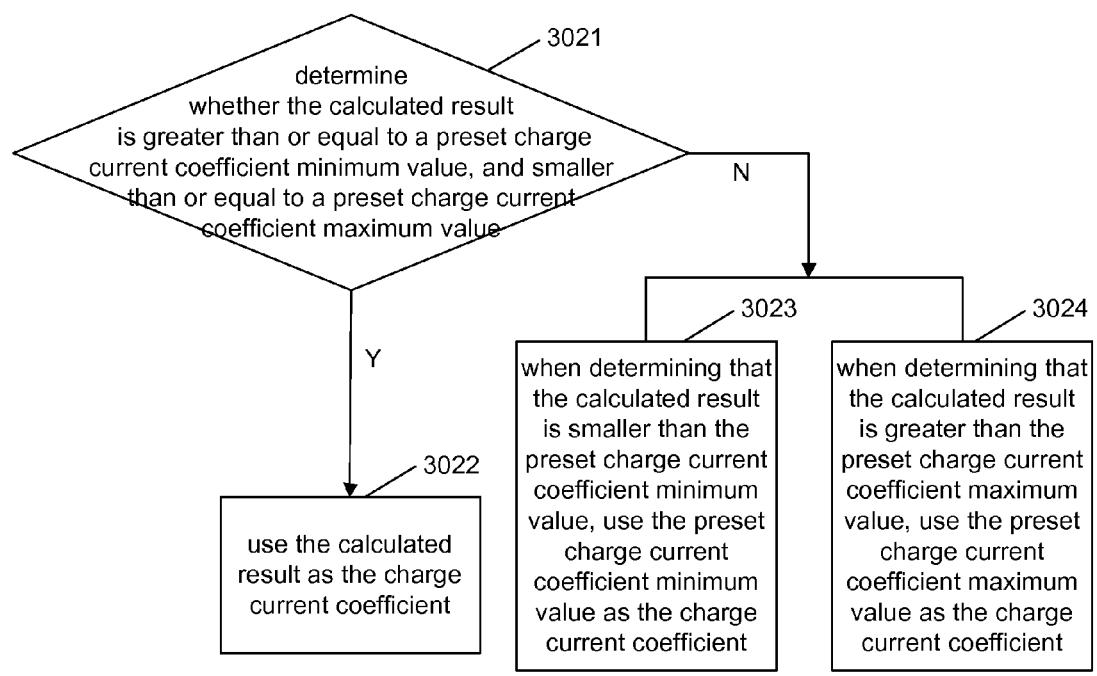
FIG. 5 is a flowchart of acquiring the charge current coefficient in an embodiment of the disclosure.

The dynamic factor is a changing component of the charge current coefficient during a charge process and changes with the temperature of the battery during the charge process. The value of the dynamic factor is regulated in real time according to a relation between the temperature of the battery and the dynamic factor, wherein the relation is counted and acquired. The capacity of the battery is reduced when the temperature of the battery is relatively high, and the charge current needs to be reduced, i.e., the charge current is reduced through reducing the dynamic factor, while the capacity of the battery is increased when the temperature of the battery is relatively low, and it needs to increase the charge current, i.e., the charge current is increased through increasing the dynamic factor. In an embodiment of the disclosure, when the current battery temperature is equal to the preset reference temperature, the acquired dynamic factor is zero; when the current battery temperature is greater than the preset reference temperature, the acquired dynamic factor is a negative value; and when the current battery temperature is smaller than the preset reference temperature, the acquired dynamic factor is a positive value;

Step 302: calculate a maximum allowed charge current according to the dynamic factor and preset static factors, wherein the static factors are used for characterizing fixed components of the charge current coefficient during the charge process;

the calculating a maximum allowed charge current according to the dynamic factor and preset static factors specifically includes: calculate the sum of the dynamic factor and the preset static factors, and acquire the charge current coefficient according to the calculated result; calculate the product of the charge current coefficient and a battery nominal capacity, and use the calculated result as the maximum allowed charge current;

Referring to FIG. 5, wherein the calculating the sum of the dynamic factor and the preset static factors and acquiring the charge current coefficient according to the calculated result specifically includes: Step 3021: determine whether the calculated result is greater than or equal to a preset charge current coefficient minimum value, and smaller than or equal to a preset charge current coefficient maximum value; if yes. Step 3022: use the calculated result as the charge current coefficient; otherwise. Step 3023: when determining that the calculated result is smaller than the preset charge current coefficient minimum value, use the preset charge current coefficient minimum value as the charge current coefficient, Step 3024: when determining that the calculated result is greater than the preset charge current coefficient maximum value, use the preset charge current coefficient maximum value as the charge current coefficient;

Step 303: control the charge of the battery according to the maximum allowed charge current.

the controlling the charge of the battery refers to ensuring that the charge current is not greater than the maximum allowed charge current. The charge process ends when the battery voltage reaches a preset target voltage value.

An example of a method for controlling charge of a battery of an embodiment of the disclosure will be illustrated below.

Figure 4:
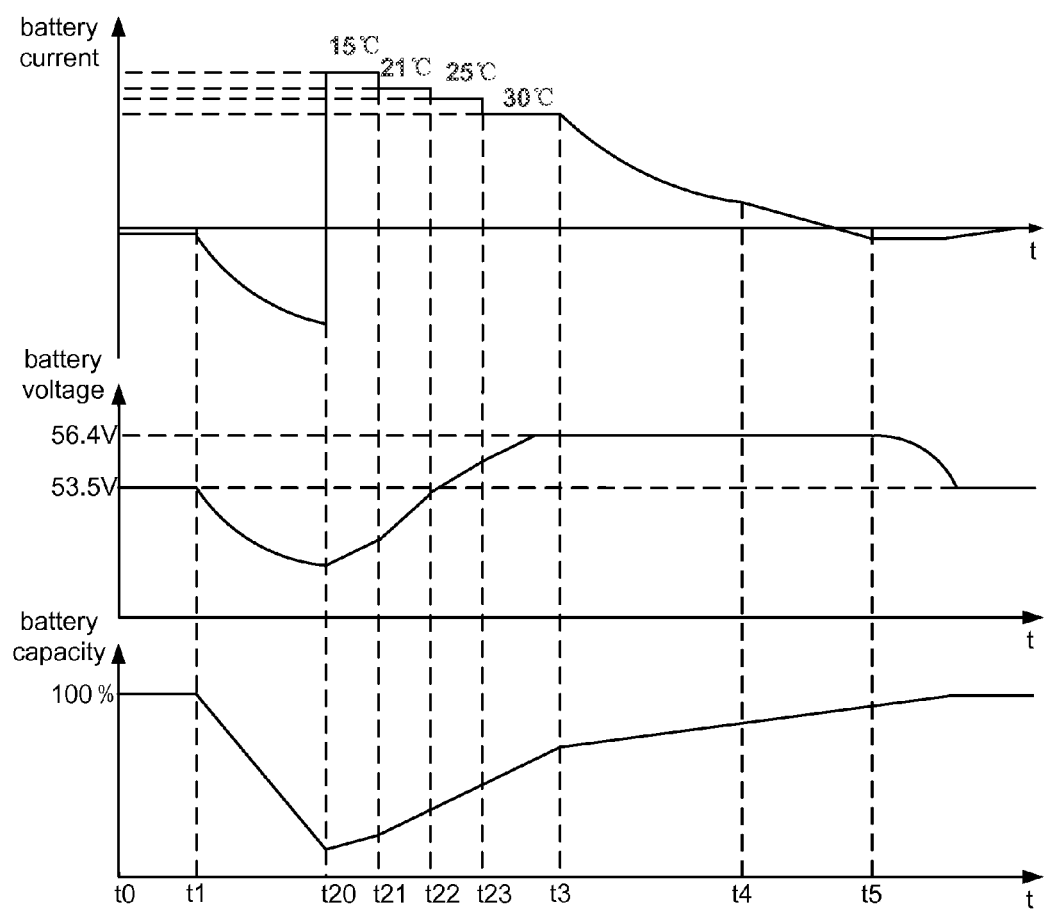
FIG. 4 is a schematic diagram illustrating current and voltage changes during charging a battery of the disclosure.

Taking a 300 A direct current communication power source on a tourist island for example, the power source uses a 200 AH battery as a backup power source and the service life of the battery is 5 years. Referring to FIG. 4, when the battery is charged, static factors Cr, Cg, Ck and Cm are respectively preset first based on the battery and a power supply system for the battery. Cr is set to be 0.15 according to a charge coefficient provided by the battery manufacturer. When the battery is charged by a generator, Cg is set to be −0.01 in order to prevent the generator from being started frequently due to an excessive charge current during an early starting stage of the generator; a main power supply system fails frequently according to a historical statistics result, and Ck is set to be 0.05 according to a power failure frequency. The service life of the battery is 5 years and Cm is set to be −0.01. Subsequently, during the charge process of the battery, the temperature of the battery is sampled in real time, and increases continuously. A dynamic factor is set to be regulated once every 2 degrees centigrade by which the temperature of the battery changes. It can be learned is accordingly that the temperature of the battery is 15 degrees centigrade at moment t20, the dynamic factor is 0.01, and a charge current coefficient acquired is 0.19; the temperature of the battery is 21 degrees centigrade at moment t21, the dynamic factor is 0.004, and a corresponding charge current coefficient is 0.184; the temperature of the battery is 25 degrees centigrade at moment t22, the dynamic factor is 0, and a corresponding charge current coefficient is 0.18; the temperature of the battery is 30 degrees centigrade at moment t23, the dynamic factor is −0.005, and a corresponding charge current coefficient is 0.175. Finally, a maximum allowed charge current of each moment is calculated and acquired, and the charge of the battery is controlled based on the maximum allowed charge current.

Based on the technical solution above, in an embodiment of the disclosure, before the charge of a battery, each static factor is preset based on the battery and a power supply system for the battery. During the charge process, the temperature of the battery is monitored in real time, a dynamic factor is regulated in real time according to the temperature of the battery, a maximum allowed charge current is calculated based on each static factor and the dynamic factor, and the charge of the battery is controlled according to the maximum allowed charge current, thereby effectively avoiding the situation where the charge current of the battery is too high or too low due to constant current charge applied to various application scenarios. This enables adaptive charge management according to application scenarios, improves the environmental adaptability of battery charging, and further extends the service life of the battery and saves costs.

INDUSTRIAL APPLICABILITY

In a solution of the disclosure, a corresponding dynamic factor is acquired according to the temperature of a battery. A maximum allowed charge current is calculated by combining the dynamic factor and each preset static factor so as to regulate the maximum allowed charge current dynamically according to environmental changes, and control the charge of the battery according to the maximum allowed charge current. Therefore, this enables adaptive charge management according to application scenarios, which effectively avoids the situation where the charge current of the battery is too high or too low, improves the environmental adaptability of battery charging, and further extends the service life of the battery and saves costs.

Obviously, those skilled in the art can make various changes and variations without departing from the spirit and scope of the disclosure. In this case, if such modifications and variations of the disclosure also fall within the claims of the disclosure and equivalent technologies thereof, the disclosure shall also contain such changes and variations.

What is claimed is:

1. A method for controlling charge of a battery, comprising:
    when charging a battery, monitoring a temperature of the battery in real time, and acquiring a corresponding dynamic factor according to the temperature of the battery, wherein the dynamic factor is used for characterizing a dynamically regulating component of a charge current coefficient during the charge process;
    calculating a maximum allowed charge current according to the dynamic factor and preset static factors, wherein the static factors are used for characterizing fixed components of the charge current coefficient during the charge process;
    controlling the charge of the battery according to the maximum allowed charge current;
    wherein the calculating a maximum allowed charge current according to the dynamic factor and preset static factors comprises:
    calculating a sum of the dynamic factor and the preset static factors, and acquiring the charge current coefficient according to the calculated result;
    calculating a product of the charge current coefficient and a battery nominal capacity, and using the calculated result as the maximum allowed charge current.

2. The method according to claim 1, further comprising: before charging the battery,
    presetting the static factors based on the battery and a power supply system for the battery.

3. The method according to claim 2, wherein the calculating a sum of the dynamic factor and the preset static factors and acquiring the charge current coefficient according to the calculated result comprises:
    determining whether the calculated result is greater than or equal to a preset charge current coefficient minimum value, and smaller than or equal to a preset charge current coefficient maximum value;
    if yes, using the calculated result as the charge current coefficient;
    otherwise, when determining that the calculated result is smaller than the preset charge current coefficient minimum value, using the preset charge current coefficient minimum value as the charge current coefficient; and when determining that the calculated result is greater than the preset charge current coefficient maximum value, using the preset charge current coefficient maximum value as the charge current coefficient.

4. The method according to claim 1, wherein the monitoring a temperature of the battery in real time and acquiring a corresponding dynamic factor according to the temperature of the battery comprises:
    monitoring the temperature of the battery in real time, and acquiring a current battery temperature;
    calculating a difference between a preset battery reference temperature and the current battery temperature, and multiplying the difference by a preset coefficient to obtain the dynamic factor;
    wherein the preset coefficient refers to a corresponding relationship between a temperature of the battery and charge current of the battery.

5. The method according to claim 4, wherein the calculating a sum of the dynamic factor and the preset static factors and acquiring the charge current coefficient according to the calculated result comprises:

determining whether the calculated result is greater than or equal to a preset charge current coefficient minimum value, and smaller than or equal to a preset charge current coefficient maximum value;

if yes, using the calculated result as the charge current coefficient;

otherwise, when determining that the calculated result is smaller than the preset charge current coefficient minimum value, using the preset charge current coefficient minimum value as the charge current coefficient; and when determining that the calculated result is greater than the preset charge current coefficient maximum value, using the preset charge current coefficient maximum value as the charge current coefficient.

6. The method according to claim 1, wherein the calculating a sum of the dynamic factor and the preset static factors and acquiring the charge current coefficient according to the calculated result comprises:

determining whether the calculated result is greater than or equal to a preset charge current coefficient minimum value, and smaller than or equal to a preset charge current coefficient maximum value;

if yes, using the calculated result as the charge current coefficient;

otherwise, when determining that the calculated result is smaller than the preset charge current coefficient minimum value, using the preset charge current coefficient minimum value as the charge current coefficient; and when determining that the calculated result is greater than the preset charge current coefficient maximum value, using the preset charge current coefficient maximum value as the charge current coefficient.

7. A device for controlling charge of a battery, comprising: a first processing unit, a second processing unit and a third processing unit, wherein the first processing unit is configured to, when charging a battery, monitor a temperature of the battery in real time, and to acquire a corresponding dynamic factor according to the temperature of the battery, wherein the dynamic factor is used for characterizing a dynamically regulating component of a charge current coefficient during the charge process;

the second processing unit is configured to calculate a maximum allowed charge current according to the dynamic factor and preset static factors, wherein the static factors are used for characterizing fixed components of the charge current coefficient during the charge process;

the third processing unit is configured to control the charge of the battery according to the maximum allowed charge current;

wherein the second processing unit is specifically configured to calculate a sum of the dynamic factor and the preset static factors, and acquire the charge current coefficient according to the calculated result; to calculate a product of the charge current coefficient and a battery nominal capacity, and use the calculated result as the maximum allowed charge current.

8. The device according to claim 7, wherein the first processing unit is configured to, before charging the battery, preset the static factors based on the battery and a power supply system for the battery.

9. The device according to claim 8, wherein the second processing unit is specifically configured to determine whether the calculated result is greater than or equal to a preset charge current coefficient minimum value, and smaller than or equal to a preset charge current coefficient maximum value; if yes, to use the calculated result as the charge current coefficient; otherwise, when determining that the calculated result is smaller than the preset charge current coefficient minimum value, to use the preset charge current coefficient minimum value as the charge current coefficient; and when determining that the calculated result is greater than the preset charge current coefficient maximum value, to use the preset charge current coefficient maximum value as the charge current coefficient.

10. The device according to claim 7, wherein the first processing unit is specifically configured to monitor the temperature of the battery in real time, and acquire a current battery temperature; to calculate a difference between a preset battery reference temperature and the current battery temperature, and multiply the difference by a preset coefficient to obtain the dynamic factor;

wherein the preset coefficient refers to a corresponding relationship between a temperature of the battery and charge current of the battery.

11. The device according to claim 10, wherein the second processing unit is specifically configured to determine whether the calculated result is greater than or equal to a preset charge current coefficient minimum value, and smaller than or equal to a preset charge current coefficient maximum value; if yes, to use the calculated result as the charge current coefficient; otherwise, when determining that the calculated result is smaller than the preset charge current coefficient minimum value, to use the preset charge current coefficient minimum value as the charge current coefficient; and when determining that the calculated result is greater than the preset charge current coefficient maximum value, to use the preset charge current coefficient maximum value as the charge current coefficient.

12. The device according to claim 7, wherein the second processing unit is specifically configured to determine whether the calculated result is greater than or equal to a preset charge current coefficient minimum value, and smaller than or equal to a preset charge current coefficient maximum value; if yes, to use the calculated result as the charge current coefficient; otherwise, when determining that the calculated result is smaller than the preset charge current coefficient minimum value, to use the preset charge current coefficient minimum value as the charge current coefficient; and when determining that the calculated result is greater than the preset charge current coefficient maximum value, to use the preset charge current coefficient maximum value as the charge current coefficient.

* * * * *